United States Patent
Kudo

(10) Patent No.: US 10,057,478 B2
(45) Date of Patent: Aug. 21, 2018

(54) FOCUS DETECTING APPARATUS AND METHOD OF CONTROLLING THE SAME

(71) Applicant: CANON KABUSHIKI KAISHA, Tokyo (JP)

(72) Inventor: Keisuke Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 15/228,999

(22) Filed: Aug. 4, 2016

(65) Prior Publication Data
US 2017/0054893 A1 Feb. 23, 2017

(30) Foreign Application Priority Data
Aug. 18, 2015 (JP) .................................. 2015-161358

(51) Int. Cl.
H04N 5/232 (2006.01)
H04N 5/235 (2006.01)

(52) U.S. Cl.
CPC ....... *H04N 5/23212* (2013.01); *H04N 5/2352* (2013.01)

(58) Field of Classification Search
CPC .................................................. H04N 5/2352
See application file for complete search history.

(56) References Cited

U.S. PATENT DOCUMENTS

| 7,880,799 | B2 * | 2/2011 | Yamasaki | G02B 7/34 |
| | | | | 348/208.12 |
| 2007/0002161 | A1 * | 1/2007 | Yamasaki | G02B 7/34 |
| | | | | 348/345 |
| 2010/0097515 | A1 * | 4/2010 | Ishii | H04N 5/23212 |
| | | | | 348/349 |
| 2012/0013786 | A1 * | 1/2012 | Yasuda | H04N 5/23212 |
| | | | | 348/349 |
| 2012/0147252 | A1 * | 6/2012 | Kunishige | H04N 5/23212 |
| | | | | 348/345 |
| 2013/0162839 | A1 * | 6/2013 | Yoneyama | H04N 5/23212 |
| | | | | 348/169 |
| 2013/0307993 | A1 * | 11/2013 | Kawarada | H04N 5/23212 |
| | | | | 348/169 |
| 2014/0320704 | A1 * | 10/2014 | Shuda | H04N 5/23212 |
| | | | | 348/241 |

(Continued)

FOREIGN PATENT DOCUMENTS

JP 2009-186914 A 8/2009

*Primary Examiner* — Cynthia Segura
(74) *Attorney, Agent, or Firm* — Canon USA Inc., IP Division

(57) ABSTRACT

A focus detecting apparatus includes a receiving unit receiving designation of a position in a region of an image, a setting unit setting a first region in the image, an object detecting unit detecting a region of an object corresponding to the first region in continuously acquired images, a focus detection unit detecting a focusing state based on a signal from the image capturing unit corresponding to the detected object region, and a calculating unit calculating a predetermined index related to focusing state. If the predetermined index of a second region indicates a first state, the setting unit sets the first region based on the second region. If the predetermined index of the second region indicates a second state and the predetermined index of a third region near the second region indicates the first state, the setting unit sets the first region based on the third region.

17 Claims, 9 Drawing Sheets

(56) References Cited

U.S. PATENT DOCUMENTS

2016/0073006 A1* 3/2016 Funamoto .......... H04N 5/23212
                                                    348/345
2017/0264816 A1* 9/2017 Shibuno ............. H04N 5/23212

* cited by examiner

FOCUS DETECTING APPARATUS AND METHOD OF CONTROLLING THE SAME

BACKGROUND OF THE INVENTION

Field of the Invention

The present invention relates to a focus detecting apparatus capable of object tracking processing and focus detection, and a method of controlling the focus detecting apparatus to perform auto-focus (AF).

Description of the Related Art

Conventional image capturing apparatus, such as a digital still camera, has a function of extracting an arbitrary object image from continuously captured images to track the object being detected in each image. Automatic focusing (AF) and automatic exposure (AE) processing are performed based on the position of an object image detected in each image. In a known method for tracking an object, an object is searched by template matching using contrast levels of a region of an object image in an image as a template. However, when a region of an image with low contrast, such as a region of an image corresponding to a person wearing a plain clothing, is set as a tracking target, focus detection becomes difficult because a region with low contrast is continuously detected.

It is known that when a tracking target is set by a user touching a display screen, such as a liquid crystal, an area for focus detection is set based on the region of the tracking target. In such a case, an object that the user does not intend to focus on might be set as a tracking target if, for example, the contour of an object is touched or a finger covers an object when touching the display screen. If the contrast of an object set as a tracking target is low, in this case, focus detection becomes difficult and focusing may not be possible.

Japanese Patent Laid-Open No. 2009-186914 discloses a technique that sets a focus detection region based on a tracking frame and inhibits tracking of an object when an initial in-focus position is undetectable.

In the technique disclosed in Japanese Patent Laid-Open No. 2009-186914, neither tracking nor AF control is performed when focus detection is not performed correctly because of, for example, low contrast of an object selected by a user.

SUMMARY OF THE INVENTION

An object of the present invention is to achieve highly accurate focus detection in object tracking processing and focus detection based on a designated position even when an object not suitable for focus detection is designated.

According to an aspect of the present invention, a focus detecting apparatus includes: an acquiring unit configured to acquire an image signal generated by an image capturing unit that performs photoelectric conversion on light passing through an imaging optical system; a receiving unit configured to receive designation of a position in a region of an image formed based on the image signal; a setting unit configured to set a first region in the image; an object detecting unit configured to detect a region of an object in the first region in the image which is continuously acquired; a focus detection unit configured to detect a focusing state of the object based on a signal from the image capturing unit, the signal corresponding to the region of an object detected by the object detecting unit; and a calculating unit configured to calculate a predetermined index related to the focusing state based on the image signal, wherein, if the predetermined index of a second region corresponding to the position designated through the receiving unit indicates a first state, the setting unit sets the first region based on the second region, and wherein, if the predetermined index of the second region indicates a second state which is less suitable for detecting the focusing state than the first state and the predetermined index of a third region near the second region indicates the first state, the setting unit sets the first region based on the third region.

Further features of the present invention will become apparent from the following description of exemplary embodiments (with reference to the attached drawings).

DESCRIPTION OF THE EMBODIMENTS

First Embodiment

A first embodiment will now be described below for a single-lens reflex (SLR) digital camera having an interchangeable lens, which is an example of an image capturing apparatus including a focus detecting apparatus according to the embodiments of the present invention.

Figure 1:
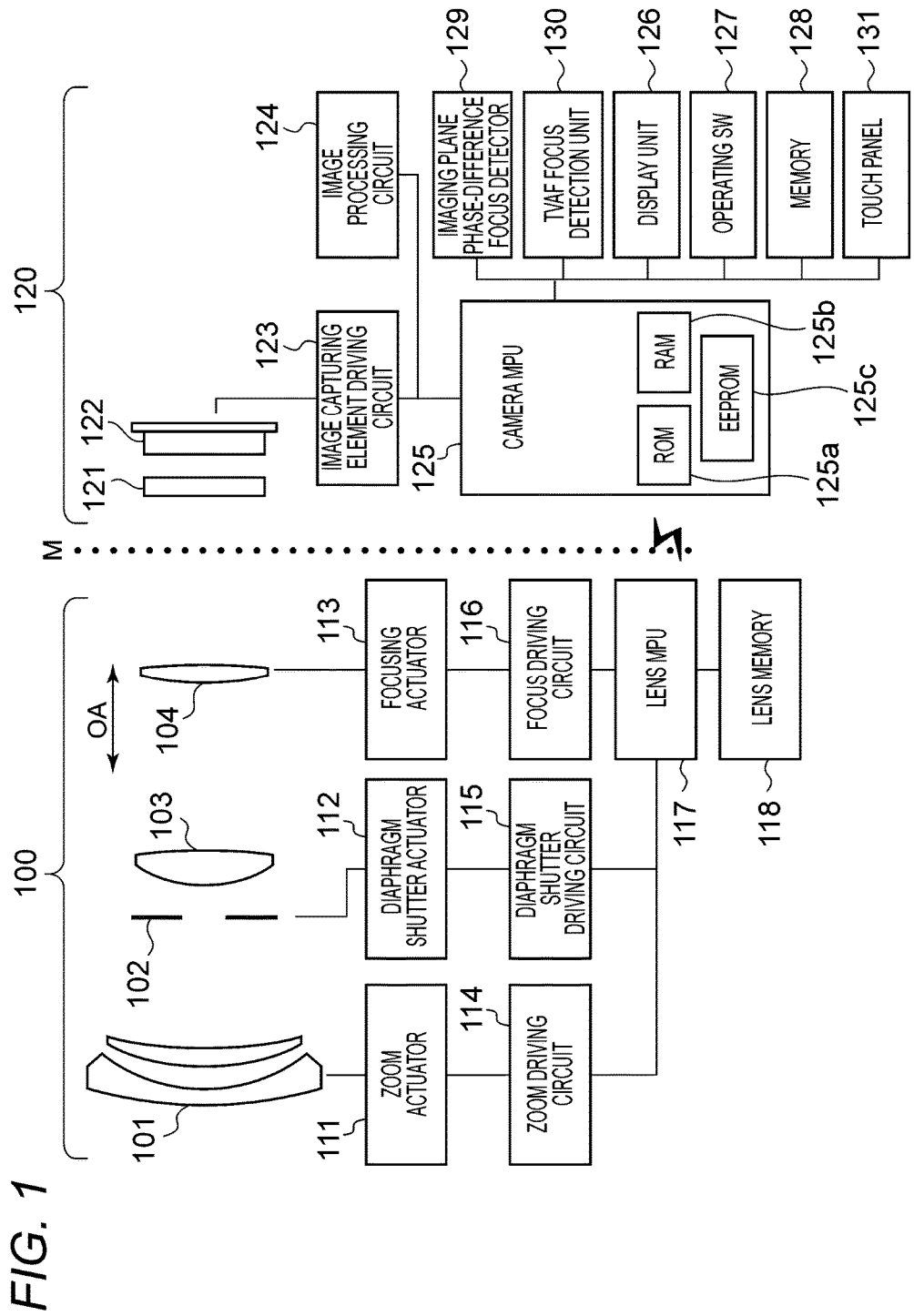
FIG. 1 is a block diagram of a configuration of a digital camera.

FIG. 1 is a block diagram illustrating a configuration of a digital camera according to an embodiment. A digital camera according to the embodiment is a single-lens reflex camera having an interchangeable lens and includes a camera body 120 to which a lens unit 100 can be mounted. The lens unit 100 is detachably mounted on the camera body 120 via a mount M illustrated in a dashed line in the middle in FIG. 1. Power is supplied and data is transmitted via an electric contact provided in the mount M. The present invention can be applied also to an image capturing apparatus other than a digital camera having an interchangeable lens.

The lens unit 100 includes a first lens group 101, a diaphragm shutter 102, a second lens group 103, and a focus lens group (hereinafter simply referred to as "focus lens") 104. The lens unit 100 includes a focus lens 104 and an imaging optical system for forming an image of an object.

The first lens group 101 is provided at the distal end of the lens unit 100; the first lens group 101 can be movable in a direction OA parallel to an optical axis (herein "optical axis direction OA"). The aperture diameter of the diaphragm shutter 102 is adjusted to control the light amount entering the optical system when capturing an image, and the diaphragm shutter 102 functions as a shutter for adjusting the exposure time when capturing a still image. The diaphragm shutter 102 and the second lens group 103 integrally move in the optical axis direction OA to perform zooming in conjunction with the moving first lens group 101. The focus lens 104 moves in the optical axis direction OA to adjust focusing on a desired object or scene.

The zoom actuator 111 moves the first lens group 101 and the second lens group 103 in the optical axis direction OA to perform zooming. The zoom actuator 111 may be implemented by known electromechanical devices such as ultrasonic motors (USM) or stepping motors (STM). A diaphragm shutter actuator 112 controls the aperture diameter of the diaphragm shutter 102 to adjust an imaging light amount and also controls the exposure time when capturing a still image.

A focusing actuator 113 moves the focus lens 104 in the optical axis direction OA. The focusing actuator 113 also functions as a position detection unit that detects the present position of the focus lens 104. The focusing actuator 113 may also be implemented by known electromechanical devices, such as an ultrasonic motor (USM) or a stepping motor (STM), or the like.

A zoom driving circuit 114 drives the zoom actuator 111 in response to a zooming operation performed by a photographer. A shutter driving circuit 115 drives the diaphragm shutter actuator 112 to control the aperture of the diaphragm shutter 102. A focus driving circuit 116 drives the focusing actuator 113 based on the result of focus detection to move the focus lens 104 in the optical axis direction OA to adjust focusing.

A lens MPU (microprocessor unit) 117 performs calculation and control related to an imaging optical system that forms an image of an object on an image capturing element 122 to control the zoom driving circuit 114, the shutter driving circuit 115, the focus driving circuit 116, and a lens memory 118. The lens MPU 117 detects the current lens position and gives notice of information on the lens position in response to a request from a camera MPU 125. The lens memory 118 stores optical information necessary for automatic focusing (AF).

The camera body 120 includes an optical filter 121 and the image capturing element 122. The optical filter 121 reduces false color and moire in a captured image. The image capturing element 122 is configured with a CMOS sensor or a CCD sensor and peripheral circuitry thereof. A photoelectric converter is provided on each of light-receiving pixels arranged in laterally m pixels by longitudinally n pixels to photoelectrically convert a light flux passing through the imaging optical system into an image signal. The image capturing element 122 is capable of giving an independent output signal for each of all pixels.

Figure 2:
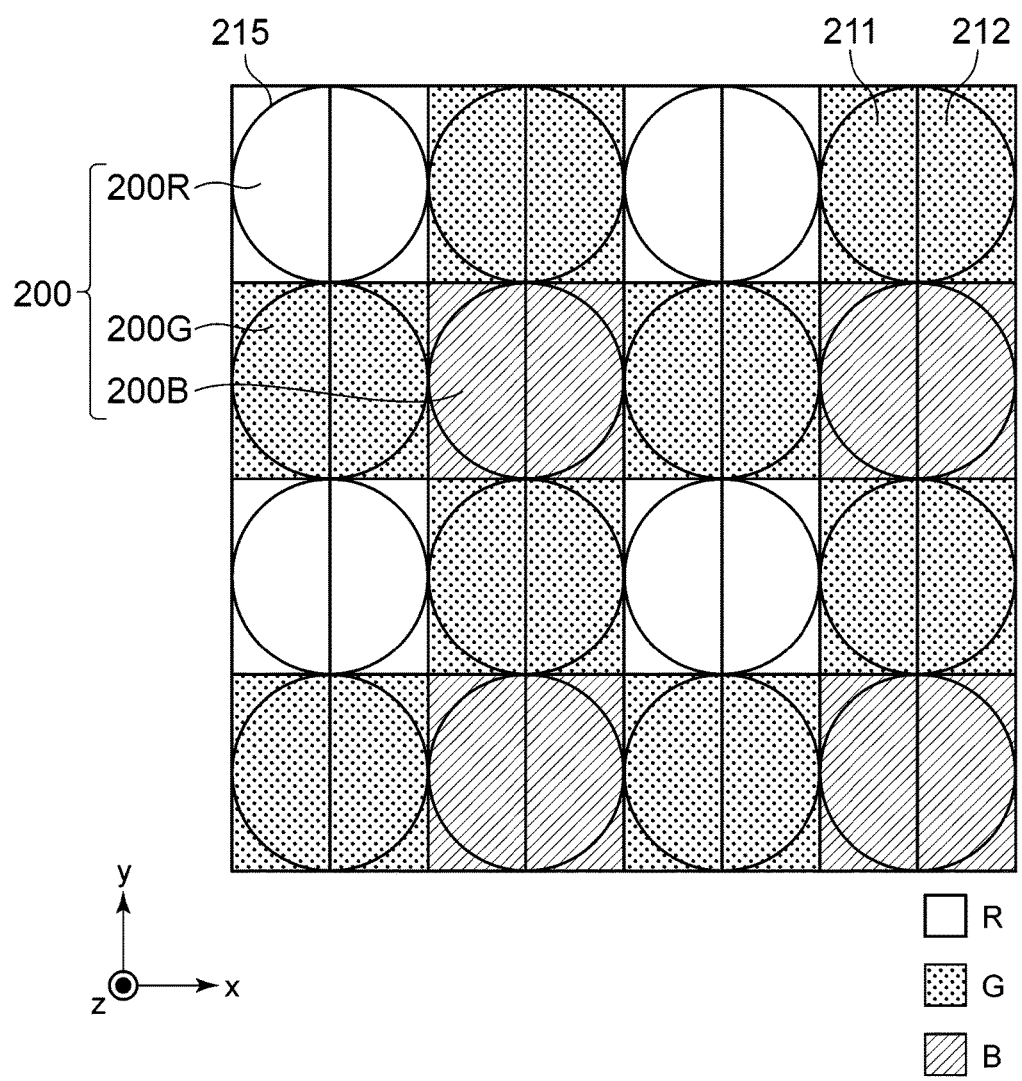
FIG. 2 schematically illustrates a pixel arrangement of an image capturing element capable of focus detection by phase-difference detection of an imaging plane.

The image capturing element 122 according to the embodiment is capable of acquiring a focus detection signal used for focusing by phase-difference detection of an imaging plane (herein also referred to as "imaging plane phase-difference AF"). FIG. 2 schematically illustrates a pixel arrangement of the image capturing element 122 according to the embodiment, where imaging pixels of a two-dimensional CMOS sensor as an example of the image capturing element 122 are arranged in four columns by four rows.

In the embodiment, pixels arranged in two rows by two columns constitute a pixel group 200, and a color filter having the Bayer pattern covers the pixel group 200. For each pixel group 200, a pixel 200R having a red (R) spectral sensitivity is positioned in the upper left, a pixel 200G having a green (G) spectral sensitivity is positioned in the upper right and the lower left, and a pixel 200B having a blue (B) spectral sensitivity is positioned in the lower right.

To perform imaging plane phase-difference AF, each pixel of the image capturing element 122 according to the embodiment has a plurality of photodiodes (photoelectric converters) for each micro lens 215. In the embodiment, two photodiodes 211 and 212, arranged in two columns by a single row, constitute each pixel. Although each pixel of the embodiment is provided with the single micro lens 215 and the two photodiodes 211 and 212, the number of provided photodiodes is not limited to two and may be more than three.

With many pixel groups 200, each composed of pixels arranged in four columns by four rows (photodiodes arranged in eight columns by four rows) as illustrated in FIG. 2, provided on an imaging plane, the image capturing element 122 can acquire an imaging signal and a focus detection signal. In each pixel configured as described above, a light flux is demultiplexed by the micro lens 215 and an image is formed on the photodiodes 211 and 212. A signal composed of signals from the two photodiodes 211 and 212 (A+B signal) is used as an imaging signal, and two signals respectively read from the photodiodes 211 and 212 (A signal, B signal) are used as focus detection signals.

Another image capturing element 122 that is capable of performing imaging plane phase-difference AF may include as focus detecting pixels a plurality of pixels each having a light-receiving section opened at a different relative location to the micro lens 215. This image capturing element 122 further includes a plurality of imaging pixels each receiving the light flux passing through the entire region of an exit pupil of the imaging optical system as well as a plurality of focus detecting pixels each receiving a light flux passing through a different region of the exit pupil of the imaging optical system. A plurality of focus detecting pixels as a whole can receive the light flux passing through the entire region of the exit pupil of the imaging optical system. For example, among pixels arranged in two rows by two columns in the image capturing element 122, the R pixel and B pixel may be replaced by focus detecting pixels without replacing a pair of diagonally positioned G pixels as the imaging pixels.

An image capturing element driving circuit 123 controls the operation of the image capturing element 122, performs A/D conversion on an acquired image signal, and transmits the resulting signal to the camera MPU 125. An image processing circuit 124 performs processing, such as gamma conversion, color interpolation, and JPEG compression, on an image acquired by the image capturing element 122.

The camera MPU (processor) 125 performs calculation and control related to the camera body 120 and controls the image capturing element driving circuit 123, the image processing circuit 124, a display unit 126, an operating switch 127, a memory 128, an imaging plane phase-difference focus detector 129, and a TVAF focus detector 130.

The camera MPU 125 is coupled to the lens MPU 117 via an electric contact in the mount M and transmits a request for acquiring lens information, such as information on a lens position, and a command for driving the lens to the lens MPU 117. The lens information acquired from the lens MPU 117 includes optical information and identification information unique to the lens unit 100.

The camera MPU 125 includes therein a ROM 125a storing a program for controlling the camera, a RAM 125b storing variables, and an EEPROM 125c storing parameters. The camera MPU 125 adjusts focusing with the program stored in the ROM 125a. In the embodiment, the camera MPU 125 gives an instruction to the lens MPU 117 based on either or both of the focus detection result obtained by imaging plane phase-difference detection and the focus detection result obtained by contrast detection to drive the focus lens 104, thereby adjusting the focus. The imaging plane phase-difference detection and the contrast detection will be described later.

The display unit 126, configured with LCD, for example, displays information related to a shooting mode of the camera, a previewing image, an image for checking a photographed image, and an in-focus display image during focus detection, for example. The operating switch 127 includes a power switch, a release (photograph trigger) switch, a zoom switch, and a shooting mode selecting switch. The memory 128 according to the embodiment records a photographed image in detachable flash memory.

The imaging plane phase-difference focus detector 129 performs a focus detection process by phase-difference detection using a focus detection signal (a pair of image signals) output from the image capturing element 122. The focus detection process by imaging plane phase-difference detection will now be described with reference to FIGS. 3 to 5.

Figure 3:
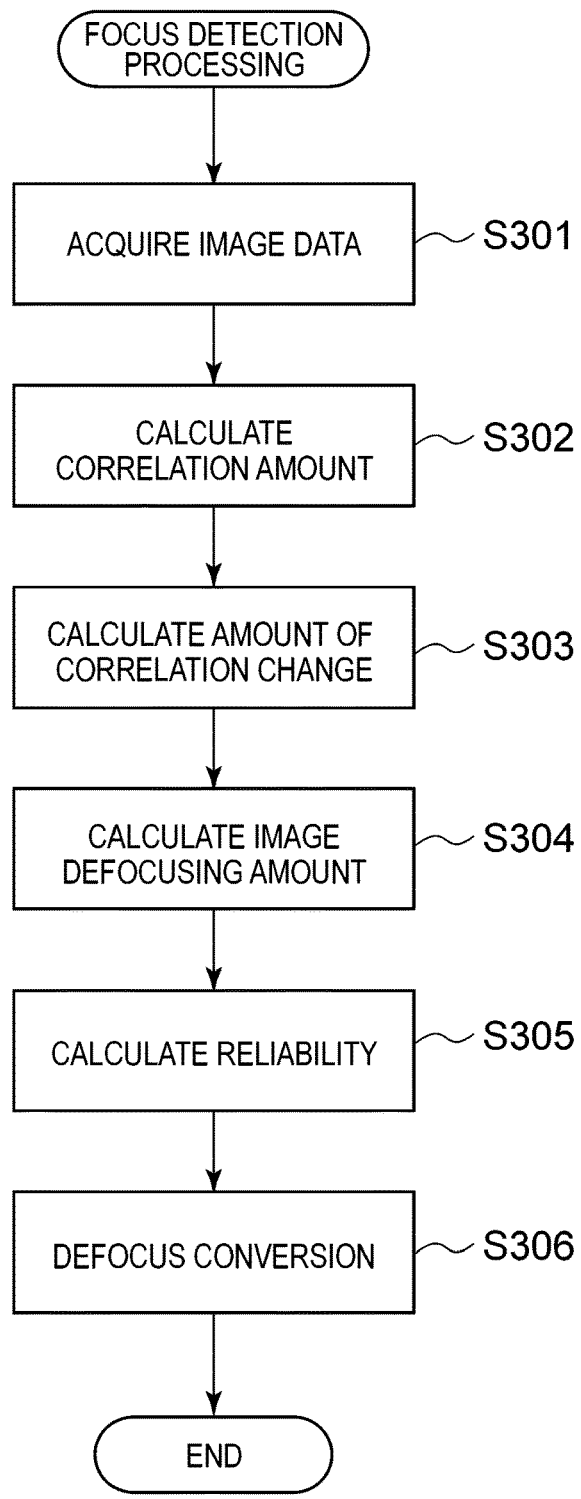
FIG. 3 is a flowchart of a focus detection process performed in phase-difference detection.

FIG. 3 is a flowchart of a focus detection process by imaging plane phase-difference detection performed by the imaging plane phase-difference focus detector 129. In S301, the imaging plane phase-difference focus detector 129 acquires a pair of image signals (a focus detection signal) from a pixel region in the image capturing element 122, which pixel region corresponding to a focus detection region which has been set. For tracking processing, which will be described later, the focus detection region is set according to an object region for which the tracking processing is performed.

In S302, the imaging plane phase-difference focus detector 129 calculates a correlation amount from a pair of image signals acquired in S301. In S303, the imaging plane phase-difference focus detector 129 calculates an amount of correlation change from the correlation amount calculated in S302. In S304, the imaging plane phase-difference focus detector 129 calculates an image defocusing amount from the amount of correlation change calculated in S303.

In S305, the imaging plane phase-difference focus detector 129 calculates reliability of the image signal acquired in S301. The reliability represents how reliable the image defocusing amount calculated in S304 is. In S306, the imaging plane phase-difference focus detector 129 converts the image defocusing amount into a defocus amount.

Figure 4A:
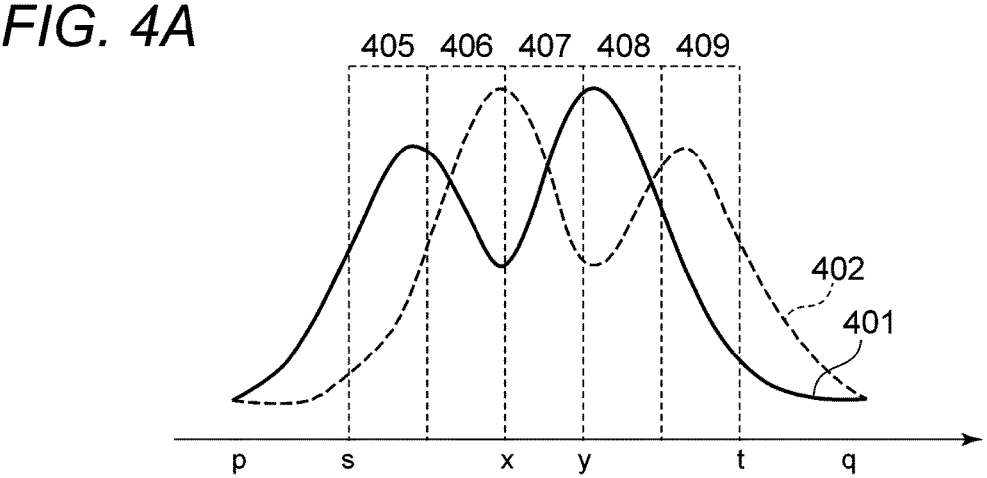
FIGS. 4A to 4C illustrate an example focus detection signal obtained from a focus detection region used in phase-difference detection.
Figure 4B:
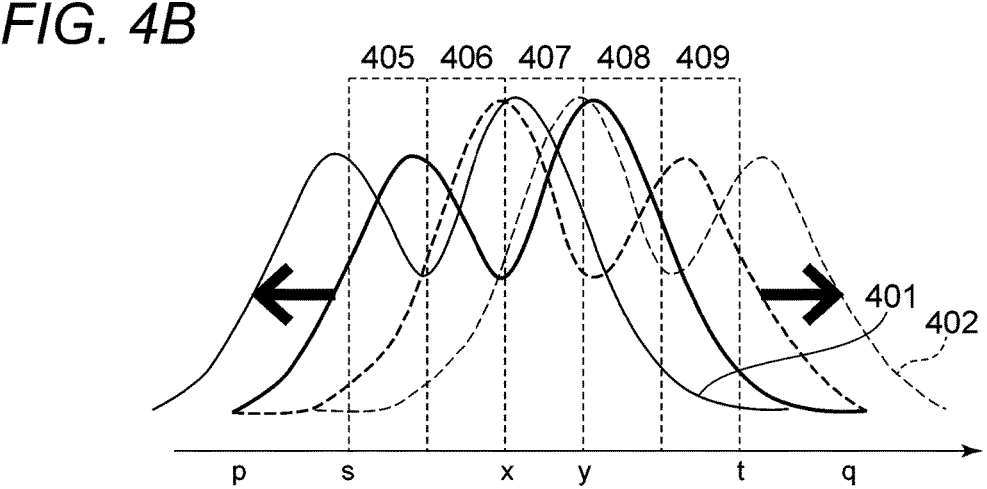
Figure 4C:
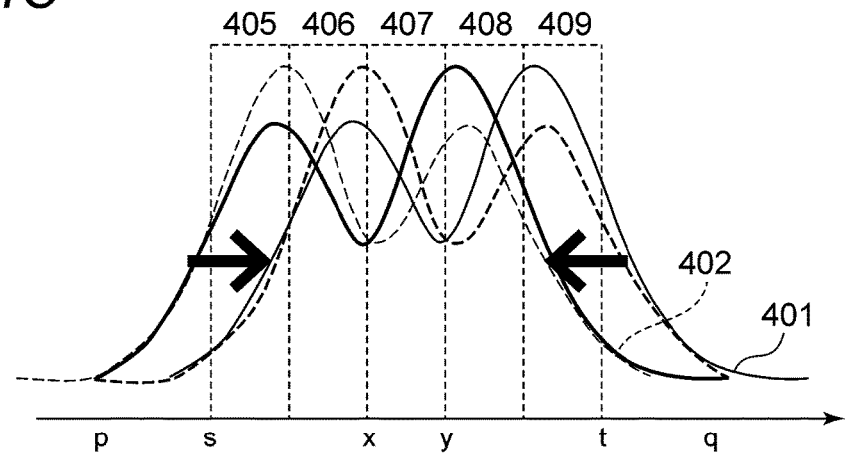

The focus detection process explained in FIG. 3 will now be described in detail with reference to FIGS. 4A to 4C and FIGS. 5A to 5D. FIGS. 4A to 4C illustrate an example of a focus detection signal acquired from a focus detection region. The range from s to t is a focus detection range, and the range from p to q is a calculation range necessary for calculating focus detection with consideration on a shift amount. The region from x to y is a single focus detection region in the divided focus detection range. A pair of focus detection signals are illustrated in a solid curve which is an A-image signal 401 and a broken curve which is a B-image signal 402.

FIG. 4A illustrates the wave-formed A-image signal 401 and the wave-formed B-image signal 402 which are not yet being shifted. FIG. 4B illustrates the wave-formed A-image signal 401 in FIG. 4A shifted to the minus side and the wave-formed B-image signal 402 illustrated in FIG. 4A shifted to the plus side. FIG. 4C illustrates the A-image signal 401 illustrated in FIG. 4A shifted to the plus side and the B-image signal 402 illustrated in FIG. 4A shifted to the minus side. To calculate the correlation amount, the A-image signal 401 and the B-image signal 402 are each shifted by 1 bit in the direction indicated by an arrow.

How a correlation amount COR is calculated in S302 will now be described. As illustrated in FIGS. 4B and 4C, the A-image signal 401 and the B-image signal 402 are each shifted by 1 bit. The sum of absolute differences between the A-image signal 401 and the B-image signal 402 is calculated for each of the focus detection regions 405 to 409 in each shifted state. The minimum shift amount is p−s, and the maximum shift amount is q−t. The correlation amount COR is calculated by Equation (1), where i is the shift amount, x is the start point of the focus detection region, and y is the finish point of the focus detection region.

Equation (1)

$$COR[i] = \sum_{k=x}^{y} |A[k+i] - B[k+i]| \qquad (1)$$

$$\{(p-s) < i < (q-t)\}$$

Figure 5A:
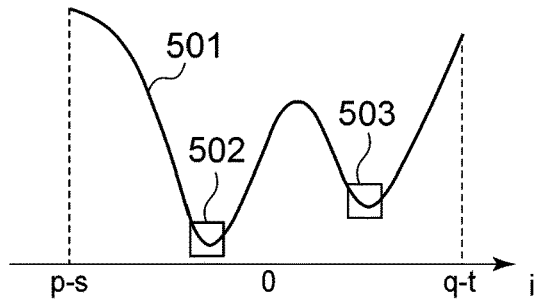
FIGS. 5A to 5D are graphs for explaining correlation and amount of correlation change of a focus detection signal.

FIG. 5A illustrates an example of a correlation amount, where the horizontal axis and the vertical axis of the chart respectively represent the shift amount and the correlation amount. Regions 502 and 503 each including an extreme value on a correlation wave line 501 are illustrated in FIG. 5A. It can be said that a smaller correlation amount represents a higher matching level between the A-image signal 401 and the B-image signal 402.

How an amount of correlation change ΔCOR is calculated in S303 will now be described. The amount of correlation change is calculated from the difference between correlation amounts separated by two shifts, according to the correlation amount wave line illustrated in FIG. 5A. In FIG. 4A, the minimum shift amount is p−s and the maximum shift amount is q−t. The amount of correlation change ΔCOR is calculated by Equation (2), where i is the shift amount.

Equation (2)

$$\Delta COR[i] = COR[i-1] - COR[i+1] (p-s+1) < i < (q-t-1) \qquad (2)$$

Figure 5B:
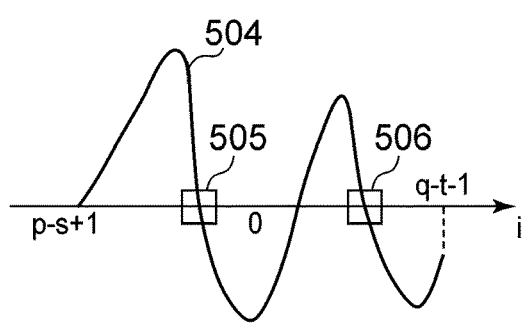

FIG. 5B illustrates an example of the amount of correlation change ΔCOR, where the horizontal axis of the chart represents the shift amount and the vertical axis of the chart represents the amount of correlation change. In regions 505 and 506, the amount of correlation change switches from plus to minus according to an amount of correlation change wave line 504. Where the amount of correlation change is zero is called a zero-cross. The matching level between the A-image signal 401 and the B-image signal 402 is the highest at the zero-cross, and an image defocusing amount is obtained based on the shift amount at the zero-cross.

Figure 5C:
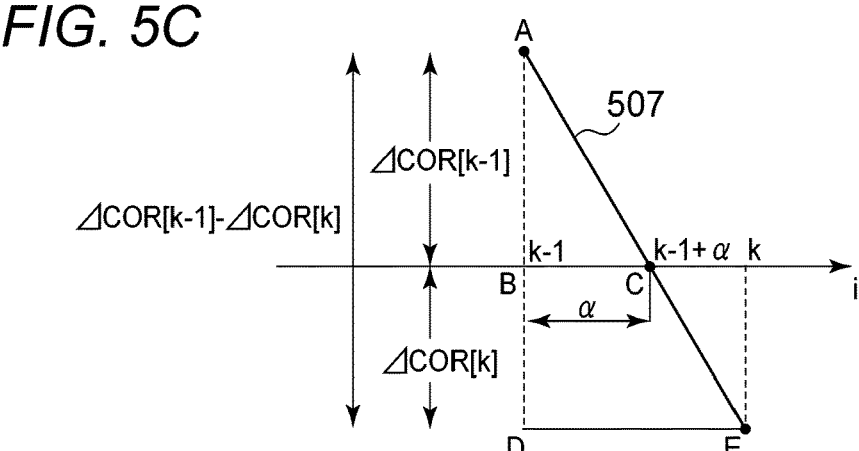

FIG. 5C is an enlarged view of the region 505 in FIG. 5B, where 507 indicates a portion of the amount of correlation change wave line 504. How an image defocusing amount PRD is calculated in S304 will now be described with reference to FIG. 5C. The zero-cross is between the shift amount (k−1) and the shift amount k. The image defocusing amount PRD is divided into an integer part β and a decimal part α. The decimal part α is calculated from the scaling relation between a triangle ABC and a triangle ADE illustrated in FIG. 5C, which is expressed by Equation (3).

Equation (3)

$$AB : AD = BC : DE \quad (3)$$
$$\Delta COR[k-1] : \Delta COR[k-1] - \Delta COR[k] = \alpha : k - (k-1)$$
$$\alpha = \frac{\Delta COR[k-1]}{\Delta COR[k-1] - \Delta COR[k]}$$

The integer part β is calculated by Equation (4) according to FIG. 5C.

Equation (4)

$$\beta = k-1 \quad (4)$$

The image defocusing amount PRD is calculated by the sum of α and β obtained as described above.

If a plurality of zero-crosses exists as illustrated in FIG. 5B, the zero-cross where the steepness-gradient of the amount of correlation change, maxder (hereinafter referred to as "steepness"), is great is regarded a first zero-cross. The steepness is an index representing easiness of identifying a focus position, and identification is easier for a point having a larger index. The steepness is calculated by Equation (5).

Equation (5)

$$\text{maxder} = |\Delta COR[k-1]| + |\Delta COR[k]| \quad (5)$$

If there is a plurality of zero-crosses as described above, the first zero-cross is determined by the steepness at each of zero-crosses.

How the reliability of an image signal is calculated in S305 will now be described. The reliability is defined by the aforementioned steepness and the matching level between A-image signal and B-image signal, fnclvl (hereinafter referred to as "two-image matching level"). The two-image matching level is an index representing the accuracy of the image defocusing amount, and the accuracy is higher for a smaller two-image matching level.

Figure 5D:
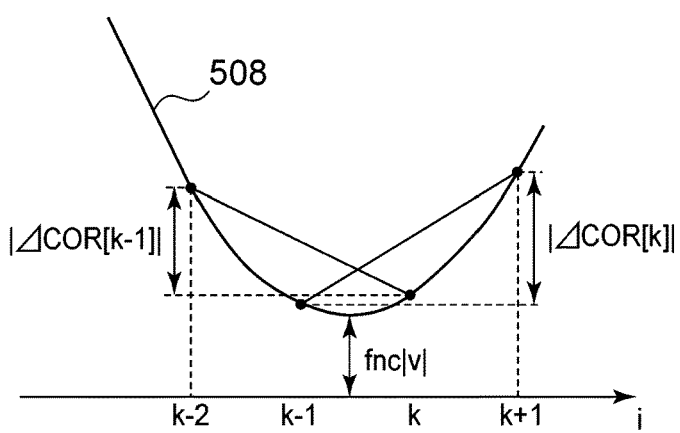

FIG. 5D is an enlarged view of the region 502 including an extreme value illustrated in FIG. 5A, where 508 is a portion of the correlation wave line 501. The two-image matching level is calculated by Equation (6).

Equation (6)

(i) If $\Delta COR[k-1] \times 2 \leq \text{maxder}$, then $\text{fnclvl} = COR[k-1] + \Delta COR[k-1]/4$ (ii) If $\Delta COR[k-1] \times 2 > \text{maxder}$, then $\text{fnclvl} = COR[k] - \Delta COR[k]/4 \quad (6)$ Referring back to FIG. 1, the TVAF focus detector 130 performs focus detection (detection of the focusing state) processing by contrast detection (TVAF method) using a contrast component of an image signal acquired by the image processing circuit 124. In the focus detection process by contrast detection, TVAF evaluation value (focus signal) is acquired while the focus lens 104 is moved to detect the position of the focus lens 104 where the TVAF evaluation value peaks, thereby detecting the focus position. The TVAF evaluation value is calculated based on a high frequency component of the image signal acquired from the pixel region of the image capturing element 122 corresponding to the focus detection region.

A touch panel 131 provided on the display unit 126 receives an instruction given by a touch operation performed by a user. The camera MPU 125 sets a tracking-start region where tracking processing starts based on the touched position indicated through the touch panel 131. When tracking processing starts, a frame, for example, indicating the focus detection region corresponding to an object to be tracked is shown in a manner superpositioned on an image displayed on the display unit 126. From this region, a signal used for focus detection by the imaging plane phase-difference focus detector 129 and the TVAF focus detector 130 is acquired. Alternatively, tracking processing can be started by the operating switch 127.

Figure 6:
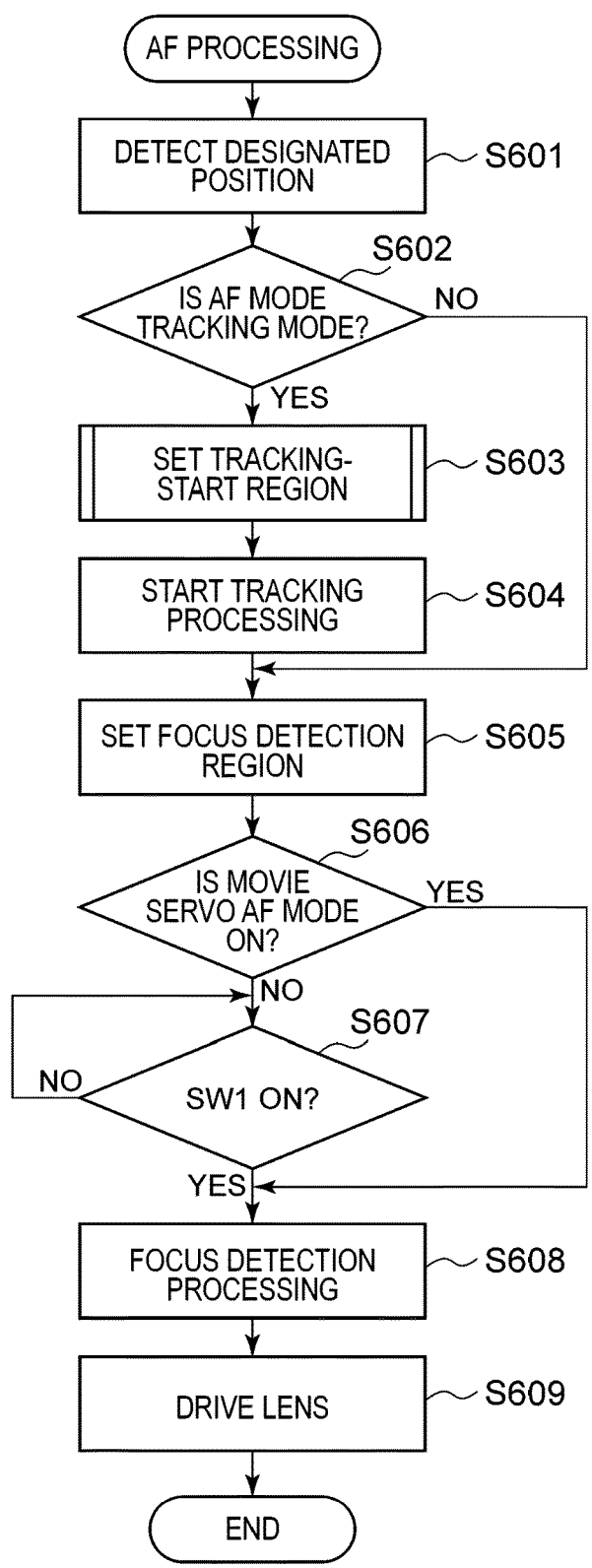
FIG. 6 is a flowchart of AF processing performed according to an embodiment.

The automatic focusing (AF) performed by the camera MPU 125 will now be described with reference to FIG. 6. FIG. 6 illustrates a flowchart of AF processing performed by the embodiment, where "S" is an abbreviation of step.

Processing illustrated in the flowchart in FIG. 6 is executed by an operation of designating a position by a user during a live view shooting, in which a preview image is displayed on the display unit 126, or during continuous recording of a moving image (movie recording). The operation of designating a position also includes a touch operation giving an instruction through a device other than the touch panel 131 described above and an operation giving an instruction through, for example, a direction button for instructing up, down, right, and left directions. The operation of designating a position is equivalent to an operation of designating the position of a focus detection region. In a tracking mode, which will be described later, the operation of designating a position can be construed as an operation of designating the position of a region where tracking processing starts (tracking-start region).

In S601, the camera MPU 125 detects the position designated by a user. Although specific examples of how a user may designate a position are described above, for step S601, it is not relevant how the position has been designated by the user. It is relevant, however, that the camera MPU 125 detects a position designated by a user.

In S602, the camera MPU 125 determines whether the AF mode is set to the tracking mode. In the tracking mode, AF is performed while an AF frame (focus detection region) is set on the object region where tracking processing is performed. The AF mode can be set through, for example, a menu screen. When the AF mode is not set to the tracking mode, NO at S602, (for example, a mode for arbitrarily selecting the focus detection region), the process proceeds directly to S605 without setting the tracking-start region, because setting of the tracking-start region is not necessary. When the AF mode is set to a mode other than the tracking mode, NO at S602, an AF frame is set at S605 at a position designated by a user to perform AF. In this case, correction of the tracking-start region, which will be described later, is not performed. If the AF mode is set to the tracking mode, YES at S602, the process proceeds to S603.

In S603, the camera MPU 125 sets a tracking-start region (template). The process of setting a tracking-start region will be described later in detail with reference to FIG. 7.

In S604, the camera MPU 125 starts the tracking processing through the image processing circuit 124 according to an object included in the tracking-start region set in S603. In the tracking processing, an arbitrary object image is extracted from continuously captured images to track the object detected in each image. The method of tracking processing is not limited to this manner. To perform the tracking processing, for example, color information of an image may be used, or face detection information may be used when the object is the face of a person.

In S605, the camera MPU 125 sets the focus detection region and displays an AF frame on the display unit 126. If the AF mode is set to the tracking mode, the focus detection region is set in the region of the object of which tracking processing has started in S604. If the AF mode is not set to the tracking mode, the focus detection region is set to the region corresponding to the position designated by the user and detected by the camera MPU in S601.

In S606, the camera MPU 125 determines whether movie servo AF mode is ON. In the movie servo AF mode, AF continues even if a user does not give an instruction to perform AF. ON and OFF of the movie servo AF mode can be set through, for example, a menu screen. If the movie servo AF mode is ON, YES at S606, the process proceeds to S608. If the movie servo AF mode is OFF, NO at S606, the process proceeds to S607, and the camera MPU 125 determines whether an operation of instructing focus detection has been given via the operating switch 127. If an operation of instructing focus detection has been given, the process proceeds to S608.

In S608, the camera MPU 125 performs focus detection using the TVAF focus detector 130 based on a signal acquired from the focus detection region. The detected result from the imaging plane phase-difference focus detector 129 may be used in parallel. In S609, the camera MPU 125 drives the focus lens 104 via the lens MPU 117 according to the result of focus detection in S608. If the movie servo AF mode is ON, the focus detection process in S608 and driving of the lens in S609 are repeated.

Figure 7:
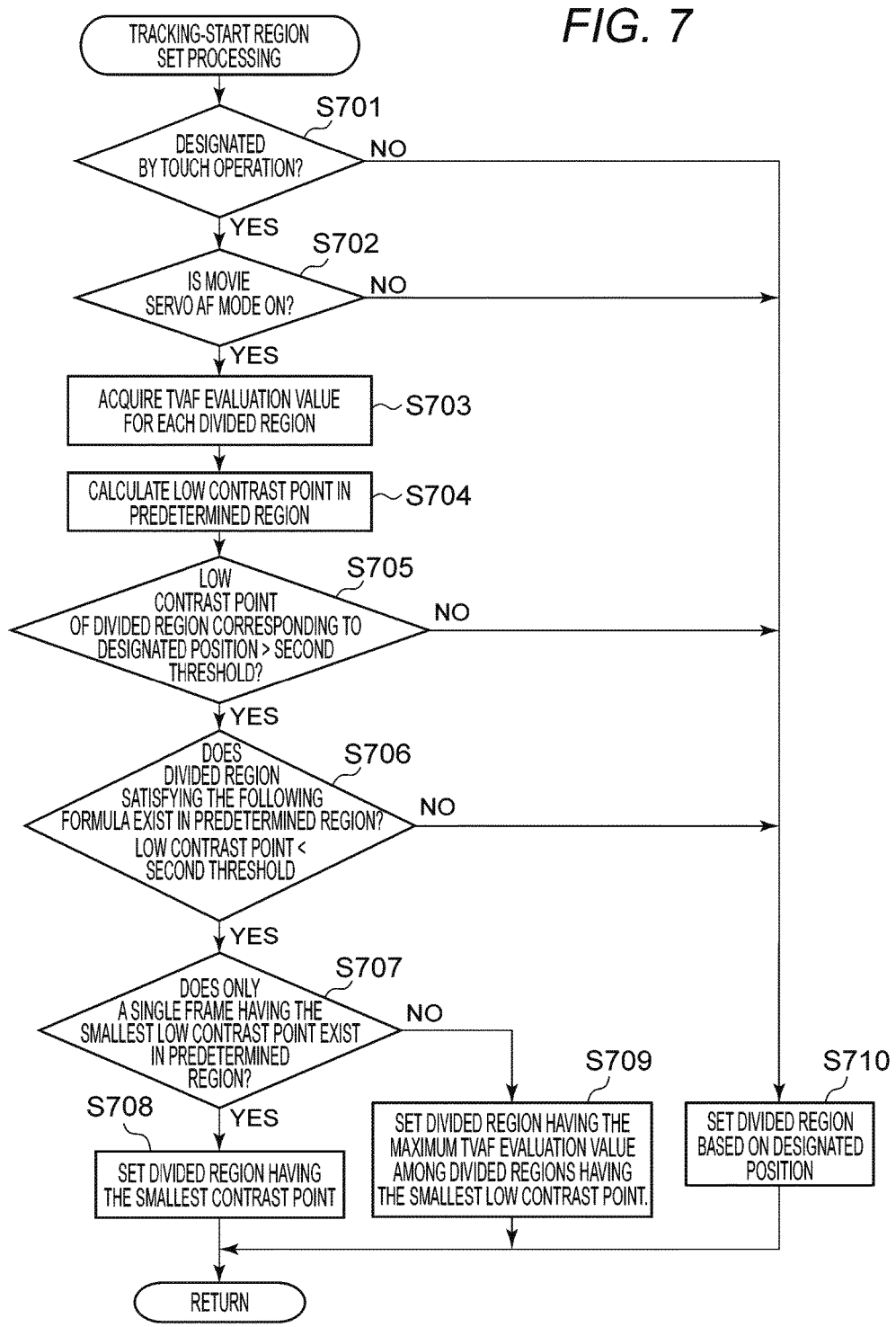
FIG. 7 is a flowchart of processing performed to set a tracking-start region according to a first embodiment.

The processing in S603 to set a tracking-start region will now be described with reference to FIG. 7. FIG. 7 illustrates a flowchart of the processing performed to set a tracking-start region according to one embodiment.

In S701, the camera MPU 125 determines whether an operation of designating a position by a user is a touch operation giving instruction through the touch panel 131. If the position has been designated by an operation other than a touch operation, NO at S701, the process proceeds to S710, and the camera MPU 125 sets as the tracking-start region the region based on the designated position. This is because, when an instruction to move the AF frame is given by operating a direction button or the like, the possibility of a user selecting an unintended object by disturbance by a finger and thereby starting the tracking processing or AF for an unintentionally selected object, which happens in a touch operation, is low. Therefore, at step S701, it is important that the camera MPU 125 determines whether an operation of designating a position by a user is a touch operation through the touch panel 131. When the position is designated by a touch operation, YES at S701, the process proceeds to S702.

In S702, the camera MPU 125 determines whether the movie servo AF mode is ON. If the movie servo AF mode is OFF, NO at S702, the process proceeds to S710, and the region based on the position designated by a touch operation is set as the tracking-start region. When the movie servo AF mode is OFF, AF is not performed in the tracking processing until an instruction to perform AF is given in S607. For a case where tracking processing starts for a selected object for which focus detection is difficult to perform, AF is not performed. Therefore, if the movie servo AF mode is ON, the process proceeds to S703.

In S703, the camera MPU 125 divides the full display into a plurality of regions, and acquires a TVAF evaluation value for each region (divided region). This processing is for determining whether the object at the designated position is suitable for AF.

In S704, the camera MPU 125 calculates a low contrast point in a predetermined region including the designated position using the TVAF evaluation value of the divided region acquired in S703. This processing is for determining for each divided region whether the contrast of an object is low. The predetermined region is composed of a plurality of divided regions including the divided region corresponding to the designated position. In the embodiment, nine divided regions arranged in three rows by three columns, which are the divided region corresponding to the designated position and the surrounding divided regions thereof, constitute the predetermined region. How the predetermined region is determined is however not limited to this manner.

The processing in S704 will now be described with reference to FIGS. 8A to 8D. FIGS. 8A to 8D illustrate the full display divided into a plurality of regions. The full display is divided into seven rows by seven columns in FIGS. 8A to 8D, though the way of dividing the full display is not limited to this manner.

Figure 8B:
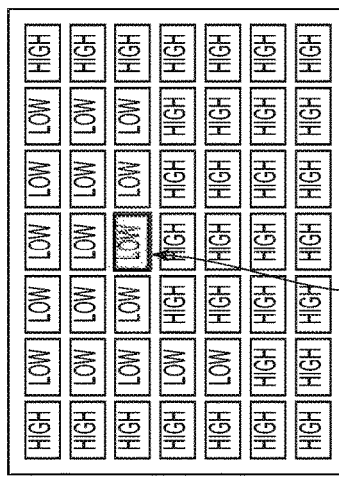
FIGS. 8A to 8D illustrate a method of correcting a tracking-start region.
Figure 8D:
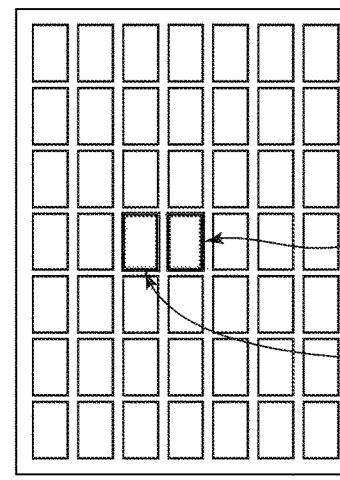
Figure 8A:
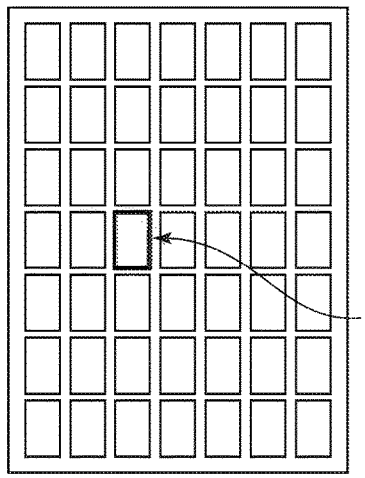

FIG. 8A illustrates a divided region 801 corresponding to the position designated by a user. FIG. 8B illustrates whether the TVAF evaluation value acquired for each divided region exceeds a predetermined first threshold. In FIG. 8B, "HIGH" indicates that the TVAF evaluation value exceeds the first threshold (high contrast), and "LOW" indicates that the TVAF evaluation value is equal to or smaller than the first threshold (low contrast). In FIG. 8B, the divided region 801 designated by a user is determined to have "LOW" contrast.

Figure 8C:
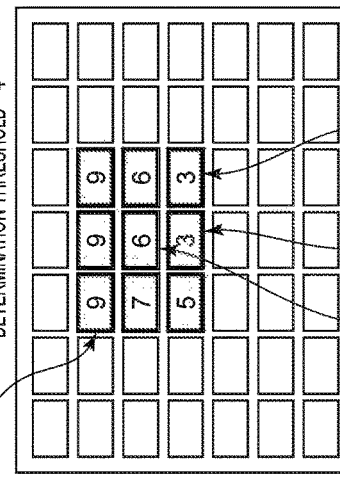

FIG. 8C illustrates a low contrast point calculated for each divided region in the predetermined region. The low contrast point is the value corresponding to the number of divided regions that are determined to have "LOW" contrast in FIG. 8B among the targeted divided region and the divided regions surrounding the targeted divided region (total of nine divided regions). For example, among the divided region 801 and the surrounding divided regions, six divided regions are determined to have "LOW" contrast, so that the low contrast point is six. In a similar manner, the low contrast point of a divided region 802 is nine, the low contrast point of a divided region 803 is three, and the low contrast point of a divided region 804 is three.

In S705, the camera MPU 125 determines whether the low contrast point of the divided region corresponding to the designated position is larger than a predetermined second threshold. For a larger low contrast point, the contrast of the object near the designated position is lower. When the low contrast point is larger than the second threshold, the object is determined to have low contrast and thus not suitable for AF.

In the embodiment, an index related to focus detection is calculated based on an image signal, and using this index, whether the object at the designated position is suitable for AF is determined. If the object at the designated position is determined not suitable for AF, the object tracking-start region is corrected to a region where the object is determined to be suitable for AF based on the indexes of near regions. In this manner, an object more suitable for focus detection is targeted to be tracked, and the focus detection region is corrected to a region more suitable for focus detection. In the embodiment, the low contrast point described above is used as the index.

In S705, when it is determined that the low contrast point of the divided region corresponding to the designated position does not exceed the second threshold, the process proceeds to S710. In this case, the object at the designated position is suitable for AF, so that the region based on the designated position is set as a tracking-start region. In other words, focus detection region is not corrected. If the low contrast point of the divided region corresponding to the designated position is determined to exceed the second threshold, the process proceeds to S706.

In S706, the camera MPU 125 determines whether a divided region having a low contrast point smaller than the second threshold exists in the predetermined region. If a divided region having a low contrast point smaller than the second threshold does not exist, the process proceeds to S710 and the region based on the designated position is set as the tracking-start region. In this case, it is determined that no object suitable for AF exists around the designated position, because no surrounding divided region has high contrast. Even if the tracking-start region is changed to one of the divided regions surrounding the region designated by a user, the accuracy of focus detection does not improve because the object to be tracked in the newly set tracking-start region has low contrast. For this reason, the tracking-start region is not corrected, prioritizing the position designated by a user. In other words, the focus detection region is not corrected. If there is a divided region having a low contrast point smaller than the second threshold in the predetermined region, the process proceeds to S707.

In S707, the camera MPU 125 determines whether only a single divided region has the smallest low contrast point in the predetermined region. If only a single divided region has the smallest low contrast point, the process proceeds to S708. If a plurality of divided regions has the smallest low contrast point, the process proceeds to S709.

In S708, the camera MPU 125 sets a tracking region based on the divided region having the smallest low contrast point. That is, the camera MPU 125 corrects the position of the tracking-start region based on the divided region having the highest contrast to correct the focus detection region so that AF is performed for an object suitable for AF.

In S709, the camera MPU 125 sets the tracking-start region among a plurality of divided regions having the smallest low contrast point based on the divided region that has the largest TVAF evaluation value. In this case, similarly to S708, the tracking-start region is corrected to correct the focus detection region so that AF is performed for an object suitable for AF.

In FIG. 8C, the aforementioned second threshold is "4" and the low contrast point of the divided region corresponding to the designated position is "6", which exceeds the second threshold. The divided regions 803 and 804 have the smallest low contrast point among the surrounding divided regions, and among the divided regions 803 and 804, one that has the larger TVAF evaluation value is selected. In the example in FIG. 8C, the TVAF evaluation value of the divided region 803 is 10000 and the TVAF evaluation value of the divided region 804 is 8000, so the divided region 803 is selected as a tracking-start region 805. Consequently as illustrated in FIG. 8D, the tracking-start region is corrected to the divided region below the divided region corresponding to the designated position. Note that, the second threshold is not limited to "4".

When setting the tracking-start region based on a divided region, the divided region and the tracking-start region need not be an identical region. The method of determining whether a divided region is not suitable for AF is not limited to the method using the low contrast point as described above. Any method using an index indicating the contrast of an image signal may be used to determine the divided region.

When the tracking-start region is set by the processing in FIG. 7, tracking processing starts in S604, and an AF frame indicating the position of the focus detection region that is set based on the tracking-start region is displayed in S605.

When an instruction is given by a touch operation, an intended object is often located below the portion touched by a finger, because the finger covers the portion below the touched portion. Therefore, the tracking-start region may be corrected such that the divided region below the divided region corresponding to the designated position is selected as the tracking-start region with priority. For example, when selecting the divided region that has the smallest low contrast point, the region below the divided region corresponding to the designated position may be weighted more than the divided region corresponding to the designated position. If there is a plurality of divided regions that has the smallest low contrast point, the divided region located in the lower side may be selected with priority over the other divided regions that have the smallest low contrast point.

In the embodiment as described above, when performing tracking processing and focus detection based on a position designated by a user, the contrast state near the designated position is determined. If the contrast of the object at the designated position is determined to be low and thus the object is determined not suitable for focus detection, the tracking-start region is corrected to a neighboring region that has a high contrast, so that an object more suitable for focus detection is tracked. In this manner, even when the contrast of an object which is intended to be tracked by a user is low, focus detection can be performed with higher accuracy.

Second Embodiment

A second embodiment will now be described with reference to the drawings. Description on the same component as the first embodiment will be omitted, and portions different from the first embodiment will mainly be described. The difference is that, in the first embodiment, the TVAF evaluation value is used to determine whether an object is suitable for focus detection, whereas in the second embodiment, the determination is made using the reliability of imaging plane phase-difference AF. In the second embodiment, the focus detection in S608 is performed by imaging plane phase-difference AF, though the TVAF method may be used in parallel.

Figure 9:
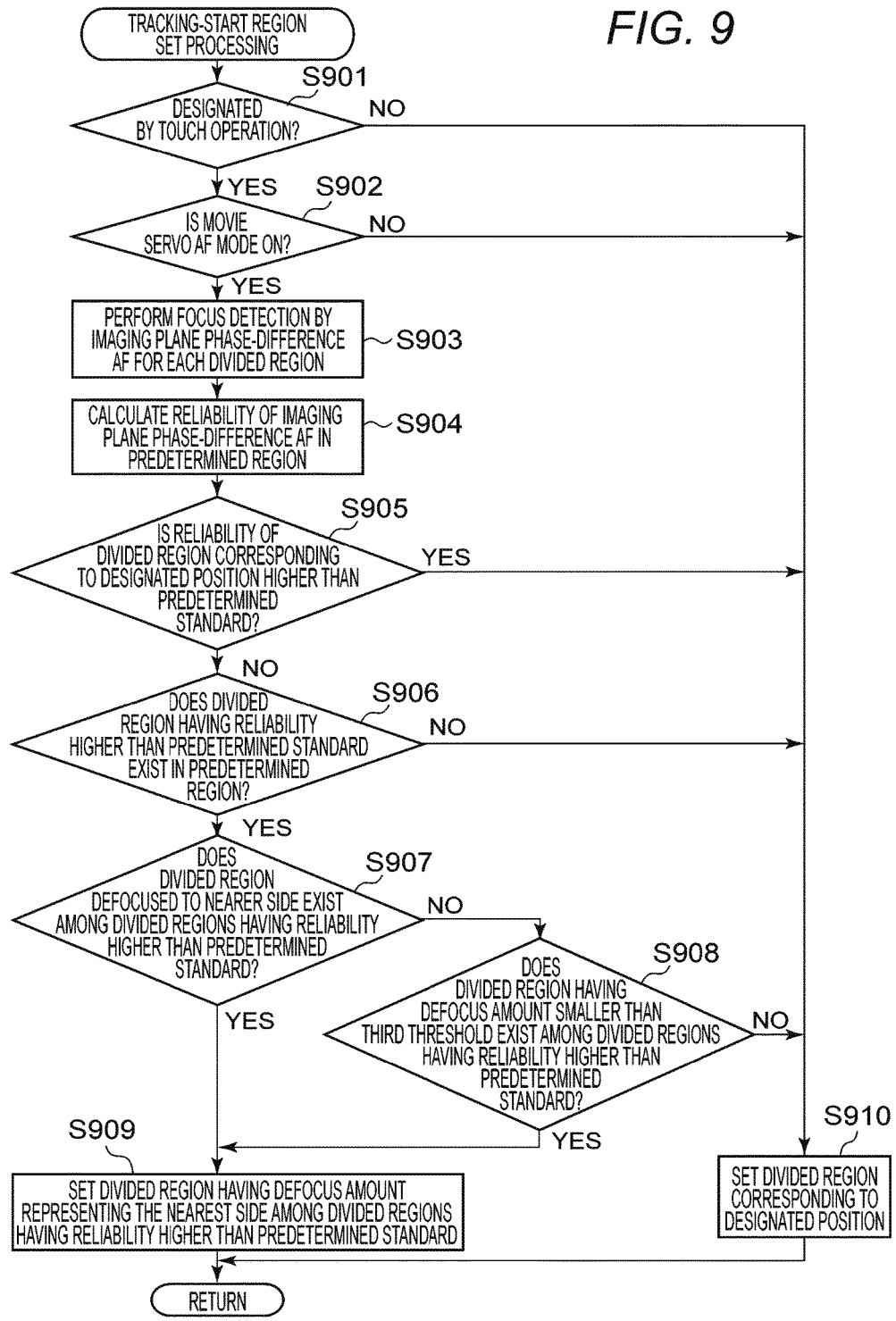
FIG. 9 is a flowchart of processing performed to set a tracking-start region according to a second embodiment.

The processing to set a tracking-start region in the second embodiment will now be described with reference to FIG. 9. FIG. 9 illustrates a flowchart for explaining the processing performed to set a tracking-start region in S603 in FIG. 6.

Determinations made in S901 and S902 are respectively same as the determinations made in S701 and S702 in FIG. 7. When a position is designated by an operation other than a touch operation or when the movie servo AF mode is OFF, the process proceeds to S910. In S910, similarly to S710 in FIG. 7, the region based on the position designated by a touch operation is set as the tracking-start region. If the position is designated by a touch operation and the movie servo AF mode is ON, the process proceeds to S903.

In S903, the camera MPU 125 divides the whole display into a plurality of regions, and performs focus detection by the imaging plane phase-difference detection using the imaging plane phase-difference focus detector 129 for each region that is divided (divided region). This processing is for determining whether the object at the designated position is suitable for AF.

In S904, the camera MPU 125 calculates the reliability of the result of focus detection in a predetermined region including the designated position using the result of focus detection for divided regions obtained in S903. This processing is for determining for each divided region whether the object in each divided region is suitable for focus detection. The predetermined region is composed of a plurality of divided regions including the divided region corresponding to the designated position. In the embodiment, nine divided regions arranged in three rows by three columns, which are the divided region corresponding to the designated position and the surrounding divided regions thereof, constitute the predetermined region. How the predetermined region is determined is however not limited to this manner. The reliability is of the image signal explained in S305 in FIG. 3, which is a value based on the matching level and contrast information of a pair of image signals. The contrast information is used for calculating the reliability since the accuracy of focus detection is higher for an image signal having higher contrast, which is a characteristic of the phase-difference detection.

In S905, the camera MPU 125 determines whether the reliability of the divided region corresponding to the designated position is higher than a predetermined standard. The predetermined standard may be, for example, a threshold for determining whether a defocus amount is reliable. If the reliability of the divided region corresponding to the designated position is higher than the predetermined standard, the process proceeds to S910. In this case, the object at the designated position is suitable for AF, so that the region based on the designated position is set as the tracking-start region. If the reliability of the divided region corresponding to the designated position is below the predetermined standard, the process proceeds to S906.

In S906, the camera MPU 125 determines whether a divided region that has reliability higher than the predetermined standard exists in the predetermined region. If a divided region that has reliability higher than the predetermined standard does not exist, the process proceeds to S910, and the divided region based on the designated position is set as the tracking-start region. In this case, it is determined that there is no object suitable for AF around the designated position, because none of the surrounding divided regions has high reliability. Even if a user changes the tracking-start region to one of divided regions surrounding the divided region designated by a user, the accuracy of focus detection does not improves because the reliability of focus detection for the object to be tracked in the newly set tracking-start region has low contrast. For this reason, the tracking-start region is not corrected, prioritizing the position designated by a user. In other words, the focus detection region is not corrected. If there is a divided region having reliability higher than the predetermined standard, the process proceeds to S907.

In S907, the camera MPU 125 determines whether a divided region that is defocused to the near side exists among divided regions that have reliability higher than the predetermined standard. If a divided region defocused to the near side exists, the process proceeds to S909, and the tracking-start region is set based on the divided region of which acquired defocus amount represents the nearest side among the divided regions having reliability higher than the predetermined standard. Selecting the divided region defocused to the nearest side in such a manner prevents the focus detection region being set for an object in the background. That is, by correcting the position of the tracking-start region based on the divided region including the nearest object among divided regions having high reliability, the focus detection region is corrected so as AF to be performed for an object suitable for AF.

When every divided region that has reliability higher than the predetermined standard is defocused to the infinite direction, the process proceeds to S908. In this case, the camera MPU 125 determines whether a divided region that has a defocus amount smaller than a third threshold exists among divided regions having reliability higher than the predetermined standard. If a divided region having a defocus amount smaller than the third threshold exists, the process proceeds to S909, and the tracking-start region is set based on the divided region of which acquired defocus amount represents the nearest side among divided regions having reliability higher than the predetermined standard. If a divided region that has a defocus amount smaller than the third threshold does not exists (if the defocus amount of every divided region is equal to or larger than the third threshold), the process proceeds to S910, and the region based on the designated position is set as the tracking-start region. If the divided region is defocused to the infinite distance by a large defocus amount, an object is likely to be of the background. When the focus detection region is set to such a divided region, AF might be performed for an object that is not intended by a user, so that the tracking-start region is not corrected. That is, the focus detection region is not corrected.

When setting the tracking-start region based on the divided region, the divided region need not be identical to the tracking-start region. Furthermore, the tracking-start region may be corrected such that the divided region below the divided region corresponding to the designated position is selected as the tracking-start region with priority also in the embodiment. For example, the region below the divided region corresponding to the designated position may be weighted more than the divided region corresponding to the designated position.

In the embodiment as described above, when performing tracking processing and focus detection based on a position designated by a user, the reliability of an image signal near the designated position is determined. If the reliability of the image signal at the designated position is determined to be low and thus an object is determined not suitable for focus detection, the tracking-start region is corrected to a divided region, near the designated position, that has highly reliable image signal and includes an object in the near side, so that an object more suitable for focus detection is tracked. In this manner, even if the contrast of the object which is intended by a user to be tracked is low, focus detection can be performed with further higher accuracy. Furthermore, in the embodiment, the tracking-start region is corrected based on to which direction the divided region is defocused and the defocus amount of the divided region near the designated position, and thereby the focus detection region being set on an object of the background is prevented.

The application of the present invention is not limited to an apparatus mainly used for photographing, such as a digital camera. The present invention is applicable to any apparatus that includes therein or is externally connectable to an image capturing apparatus, such as a mobile phone, a personal computer (for example, a laptop computer, a desktop computer, or a tablet computer), and a gaming machine. The "image capturing apparatus" described in the specification includes any electronic device including an image capturing function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161358, filed Aug. 18, 2015, which is hereby incorporated by reference herein in its entirety.

What is claimed is:
1. A focus detecting apparatus comprising:
a processor; and
a memory storing instructions, which when executed by the processor, cause the focus detecting apparatus to function as:
  an acquiring unit configured to acquire an image signal generated by an image capturing unit that performs photoelectric conversion on light passing through an imaging optical system;
  a receiving unit configured to receive designation of a position in a region of an image formed based on the image signal;
  a setting unit configured to set a first region in the image;
  an object detecting unit configured to detect a region of an object corresponding to the first region in the image which is continuously acquired;
  a focus detection unit configured to detect a focusing state of the object based on a signal from the image capturing unit, the signal corresponding to the region of an object detected by the object detecting unit; and
  a calculating unit configured to calculate a predetermined index related to the focusing state based on the image signal,
  wherein, when the predetermined index of a second region corresponding to the position designated through the receiving unit indicates a first state, the setting unit sets the first region based on the second region, and
  wherein, when the predetermined index of the second region indicates a second state which is less suitable for detecting the focusing state than the first state and the predetermined index of a third region near the second region indicates the first state, the setting unit sets the first region based on the third region.

2. The focus detecting apparatus according to claim 1, wherein the predetermined index is based on contrast of the image signal.

3. The focus detecting apparatus according to claim 1, further comprising a focus adjusting unit configured to perform focus adjustment based on the focusing state,
wherein, in a first mode in which the focus adjustment is continuously performed for tracking processing, the setting unit sets the first region based on the second region when the predetermined index of the second region indicates the first state, and sets the first region based on the third region when the predetermined index of the second region indicates the second state and the predetermined index of the third region near the second region indicates the first state.

4. The focus detecting apparatus according to claim 3, wherein, in a second mode in which the focus adjustment is not performed for the tracking processing, the setting unit sets the first region based on the second region without using the predetermined index.

5. The focus detecting apparatus according to claim 3, wherein, when the tracking processing is not performed, the focus detection unit detects the focusing state based on a position designated through the receiving unit.

6. The focus detecting apparatus according to claim 1, further comprising
a display unit configured to display a region where the focusing state is detected.

7. The focus detecting apparatus according to claim 1, wherein the focus detection unit detects the focusing state based on a focus signal generated from a high frequency component of the image signal, and
wherein the predetermined index indicates contrast of the image signal based on the focus signal, and the second state indicates contrast of the image signal lower than the first state.

8. The focus detecting apparatus according to claim 7, wherein the calculating unit calculates the predetermined index of each of the second region and a plurality of third regions, and
wherein, when the predetermined index of the second region indicates the second state, the setting unit selects, based on the predetermined index of each of the third regions, the third region having the image signal indicating high contrast, and sets the first region based on the selected third region.

9. The focus detecting apparatus according to claim 7, wherein, when the predetermined index of the second region indicates the second state, the setting unit selects, based on the predetermined index of each of the third regions, the third region having the image signal indicating high contrast, and when a plurality of third regions is selected, the setting unit sets the first region based on the third region having a highest focus signal.

10. The focus detecting apparatus according to claim 7, wherein the second region and the third region each corresponds to a divided region among a plurality of regions formed by dividing the image, and
wherein the predetermined index is calculated based on a number of the divided regions having the image signal indicating low contrast among the divided regions, which are the targeted divided region and the divided regions surrounding the targeted divided region.

11. The focus detecting apparatus according to claim 1, wherein the focus detection unit detects by phase-difference detection a defocus amount and to which direction the region is defocused based on a pair of image signals generated by the image capturing unit, and
wherein the predetermined index indicates reliability of the image signal, and in the second state, the image signal has lower reliability than in the first state.

12. The focus detecting apparatus according to claim 11, wherein the calculating unit calculates the predetermined index of each of the second region and a plurality of third regions surrounding the second region, and wherein, when the predetermined index of the second region indicates the second state, the setting unit selects, based on the predetermined index of each of the plurality of third regions, the third region having the image signal indicating high reliability, and sets the first region based on the third region including an object in a nearer side among the third regions.

13. The focus detecting apparatus according to claim 12, wherein, when the predetermined index of the second region indicates the second state, the setting unit selects the third region having the image signal indicating high reliability based on the predetermined index of each of the third regions, and sets the first region based on the second region if all the third regions are defocused to an infinite distance and a defocus amount of every third region is equal to or larger than a threshold.

14. The focus detecting apparatus according to claim 13, wherein, when a position is designated by a touch operation through the receiving unit, the setting unit sets the first region based on the second region when the predetermined index of the second region indicates the first state, and sets the first region based on the third region when the predetermined index of the second region indicates the second state and the predetermined index of the third region near the second region indicates the first state.

15. The focus detecting apparatus according to claim 14, wherein, when the position designated through the receiving unit is designated by an operation other than a touch operation, the setting unit sets the first region based on the second region without using the predetermined index.

16. The focus detecting apparatus according to claim 14, wherein, when the position designated through the receiving unit is designated by a touch operation, the setting unit sets the first region using with priority the third region located near the second region.

17. A method of controlling a focus detecting apparatus comprising:

acquiring an image signal generated by an image capturing unit that performs photoelectric conversion on light passing through an imaging optical system;

receiving designation of a position in a region of an image formed based on the image signal;

setting a first region in the image;

detecting a region of an object corresponding to the first region in the image which is continuously acquired;

detecting a focusing state of the object based on a signal from the image capturing unit, the signal corresponding to the detected region of an object; and calculating a predetermined index related to the focusing state based on the image signal, wherein, when the predetermined index of the second region corresponding to the designated position indicates a first state, the first region is set based on the second region, and wherein, when the predetermined index of the second region indicates a second state which is less suitable for detecting the focusing state than the first state and the predetermined index of a third region near the second region indicates the first state, the first region is set based on the third region.

* * * * *